United States Patent [19]

Moore

[11] 4,026,790

[45] May 31, 1977

[54] REMOVAL OF ZN OR CD AND CYANIDE FROM CYANIDE ELECTROPLATING WASTES

[75] Inventor: Fletcher L. Moore, Knoxville, Tenn.

[73] Assignee: The United States of America as represented by the United States Energy Research and Development Administration, Washington, D.C.

[22] Filed: Mar. 7, 1975

[21] Appl. No.: 556,353

[52] U.S. Cl. .................................. 210/21; 423/100
[51] Int. Cl.$^2$ ......................................... B01D 11/00
[58] Field of Search ...................... 423/100; 210/21

[56] References Cited

UNITED STATES PATENTS

| | | | |
|---|---|---|---|
| 3,258,307 | 6/1966 | George | 423/100 X |
| 3,259,568 | 7/1966 | Jordan et al. | 210/21 X |

Primary Examiner—Frank A. Spear, Jr.
Attorney, Agent, or Firm—Dean E. Carlson; David S. Zachry; Irving Barrack

[57] ABSTRACT

A method is described for the efficient stripping of stable complexes of a selected quaternary amine and a cyanide of Zn or Cd. An alkali metal hydroxide solution such as NaOH or KOH will quantitatively strip a pregnant extract of the quaternary ammonium complex of its metal and cyanide content and regenerate a quaternary ammonium hydroxide salt which can be used for extracting further metal cyanide values.

4 Claims, 1 Drawing Figure

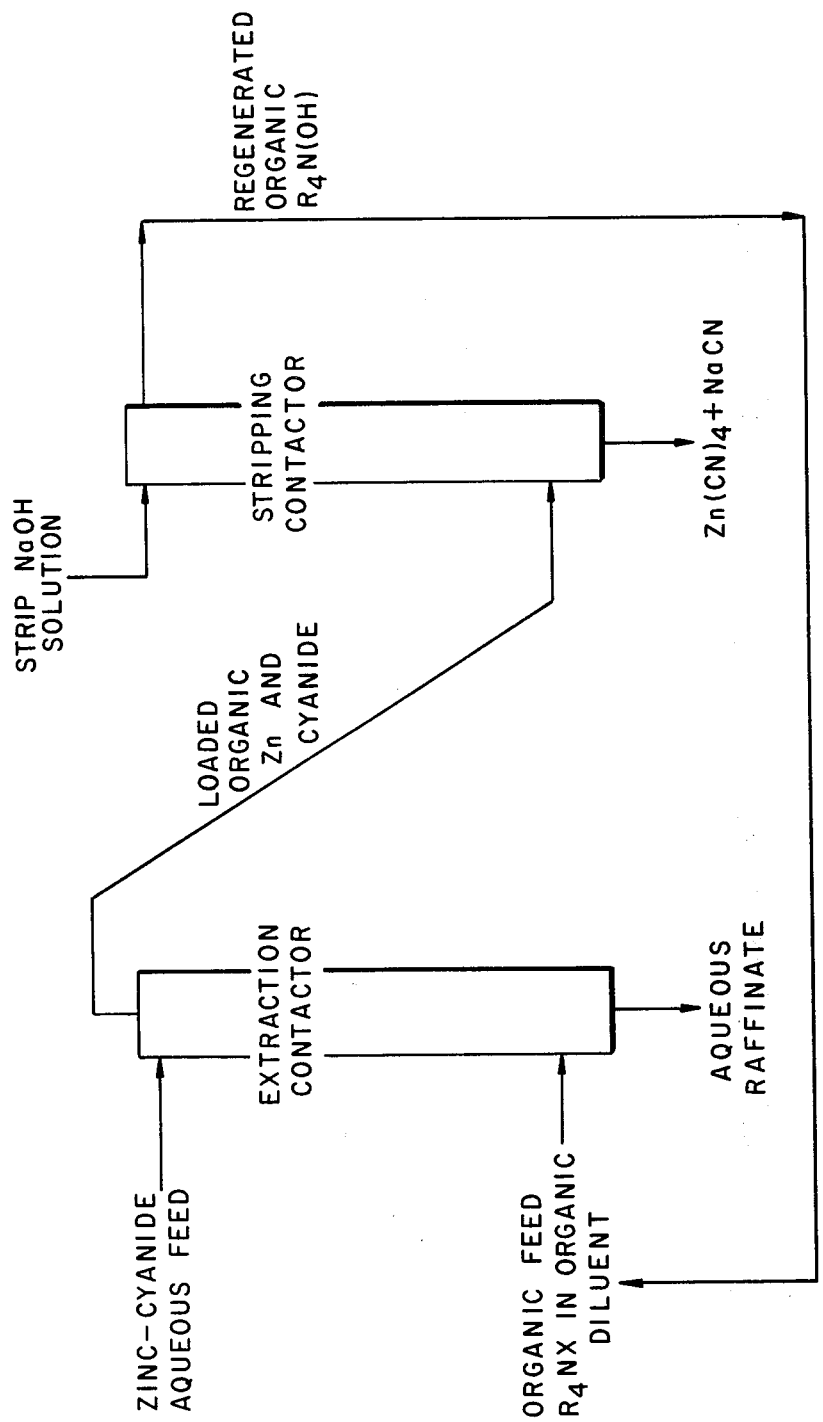

REMOVAL OF ZN OR CD AND CYANIDE FROM CYANIDE ELECTROPLATING WASTES

The invention described herein was made in the course of, or under, a contract with the U.S. Atomic Energy Commission.

BACKGROUND OF THE INVENTION

The present invention relates to an improved liquid-liquid solvent extraction process for removing and recovering Zn or Cd and cyanide values from cyanide solutions, such as those produced from electroplating aqueous effluents. These include, but are not limited to, spent electroplating solutions as well as relatively larger volumes of rinse waters used to rinse electroplated parts to remove cyanide therefrom. In previous years such effluents were routinely discharged to public water. Today, environmental standards imposed by federal, state, and municipal laws and regulations impose increasing rigorous requirements on the maximum permissible cyanide and toxic levels of Zn or Cd contained in aqueous effluents discharged into public streams.

SUMMARY OF THE INVENTION

The present invention is proposed to process such metal cyanide solutions by a liquid-liquid extraction process. A technically feasible liquid-liquid extraction process must be capable of quantitative extraction of the metal as well as cyanide to yield an aqueous raffinate which meets public health standards. In addition, the extraction reagent should be recoverable for continual reuse. This is turn requires a stripping reagent which efficiently strips out both the metal and cyanide values from the extractant and does not dissolve or react with the extractant. Additionally, the strip solution ideally is one which could be recycled to reformulate the plating bath or for salvage.

It has been found that certain water-insoluble quaternary ammonium halides made by methylation of straight chain, saturated, symmetrical tertiary amines will extract both Zn and Cd as well as cyanide ions from aqueous cyanide-containing feeds. The mechanism of extraction can be viewed as occurring by the formulation of stable cyanide complex with the quaternary halide salt as follows:

1. $M^{+2} + 4(CN)^- \rightleftharpoons M(CN)_4^{-2}$     (1)
2. $[M(CN)_4]_a^{-2} + 2(R_4NX)_o \rightleftharpoons [(R_4N)_2M(CN)_4]_o + 2(X)_a^-$     (2)

where $R_4NX$ is a selected quaternary amine halide, preferably chloride, M is Zn or Cd, $a$ signifies the aqueous phase and $o$ signifies the organic phase. The extraction proceeds by reaction of the quaternary amine halide to form a highly stable aqueous-insoluble but organic soluble complex salt with the aqueous soluble $M(CN)_4^{-2}$ species. According to my invention, I propose to strip the zinc or cadmium cyanide-loaded extractant with an aqueous alkali metal hydroxide, such as sodium hydroxide or potassium hydroxide, strippant and regenerate a quaternary amine extractant so that it can be reused as a hydroxy salt as shown in the following equation:

3. $[(R_4N)_2M(CN)_4]_o + 2NaOH \rightleftharpoons 2[R_4N(OH)]_o + M(CN)_4 + 2Na$     (3)

From reaction (3) is is seen that the alkaline solution functions to strip out cyanide and zinc values into the aqueous phase and convert the quaternary zinc-cyano complex to a quaternary hydroxide salt. This hydroxide salt can now be used in the same manner as the starting quaternary ammonium halide. Effective extractants for use in this invention are available from General Mills Company, Kankakee, Ill., as Aliquat 336 and from Ashland Chemical Company as Andogen 464. Both products are identified by the manufactures as liquid aqueous insoluble quaternary ammonium chloride made by methylation of a straight chain saturated symmetrical tertiary amine. The quarternary compound is designated as

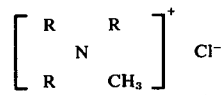

where R is a mixture of $C_8$ and $C_{10}$ carbon chains. The quaternary amine halides function as a liquid ion exchange reagent to extract and concentrate zinc cyanide anionic species from the aqueous phase as shown in equation (2).

BRIEF DESCRIPTION OF DRAWING

The single FIGURE is a flowsheet of the process according to this invention demonstrating the extraction and stripping of zinc and cyanide from an aqueous feed.

DESCRIPTION OF THE PREFERRED EMBODIMENT

Extraction, stripping, and extractant regeneration are conducted in typical countercurrent solvent-extraction procedures as shown in the flowsheet. A zinc-cyanide feed is countercurrently contacted with a selected quaternary ammonium chloride dissolved in an inert organic diluent. A variety of organic diluents may be used. Aliphatic diluents, such as n-dodecane and Amsco 125-82, a kerosene-type diluent, as well as aromatic diluents, such as diethylbenzene have been found to be suitable. When aliphatic solvents are used, the organic phase should contain up to about 5% by volume of a solvent modifier, such as tridecyl alcohol to increase the amine salt solubility in the organic phase. The aqueous raffinate will be essentially zinc-free and meet permissible limits for discharge. It may also contain minute, typically less than 2 ppm, cyanide. In cases where this is regarded as a hazard, the cyanide may be destroyed by oxidation with sodium hypochlorite, NaOCl. The hypochlorite oxidizes the cyanide to $CO_2$ and precipitates any Zn as an insoluble zinc hydroxide. If necessary, the zinc may be filtered before discharging the raffinate, if economics warrant or health standards require. The zinc and cyanide-loaded organic phase is then transferred to a stripping column or contacter in countercurrent contact with a sodium hydroxide solution where the Zn and cyanide values are stripped into the aqueous phase and the extraction reagent is regenerated as a quaternary ammonium hydroxide for recycling to extract additional zinc and cyanide. The same flowsheet may be applied to extract Cd cyanide solutions and strip the pregnant organic phase with an alkali metal hydroxide such as NaOH or KOH.

The extraction of Zn-65 in trace amounts (less than 1 microgram/ml) from a basic zinc cyanide solution with Aliquat 336 is shown in Table I.

TABLE I

Extraction of ⁶⁵Zn Tracer From NaCN Solutions With 0.1 M Aliquat 336

| Aqueous Phase NaOH (M) | Equilibrium pH | ⁶⁵Zn Extracted, % |
|---|---|---|
| | NaCN M = 0.0002 | |
| | 9.8 | 43.5 |
| | 10.3 | 78.3 |
| | 12.0 | >99.9 |
| | 12.5 | >99.9 |
| 1 – 2 | | 99.9 |
| 4 | | 96.5 |
| 6 | | 84.8 |
| | NaCN M = 0.002 | |
| | 9.8 | 50.0 |
| | 10.3 | 96.7 |
| | 12.0 | 99.8 |
| | 12.5 | >99.9 |
| 1 – 2 | | 99.9 |
| 4 | | 98.6 |
| 6 | | 86.5 |
| | NaCN M = 0.02 | |
| | 10.3–12.5 | >99.9 |
| 1 – 2 | | >99.9 |
| 4 | | 99.1 |
| 6 | | 93.6 |
| 7.5 | | 65.0 |

It is seen that zinc extracts very efficiently over a wide range of sodium hydroxide concentration. Extraction of cyanide takes place concurrently. Thus, zinc cyanide feed solutions containing 50 ppm cyanide are extracted to produce less than 2 ppm in the aqueous raffinate. Extraction results obtained with feeds containing macro concentrations of zinc from 0.4M NaCN is shown in Table II.

TABLE II

Extraction of Macro Concentrations of Zinc From 0.4M NaCN Solution With 0.1M Aliquat 336 In Dodecane With 5% Tridecyl Alcohol

| Zinc conc (mg/ml) | Zn Extracted (%) |
|---|---|
| <0.001 | >99.9 |
| 0.2 | >99.9 |
| 0.6 | >99.9 |
| 1 | >99.9 |
| 2 | 99.9 |
| 4 | 78.1 |
| 6 | 52.9 |
| 8 | 40.8 |

According to the invention a sodium hydroxide solution is now used to strip out zinc and cyanide from the organic phase. Table III below shows the degree of Zn-65 stripped with sodium hydroxide solutions at several quaternary amine salt concentrations.

TABLE III

Stripping of ⁶⁵Zn Tracer From Aliquat 336 In Kerosene-Type Diluent (5% TDA) With Sodium Hydroxide

| Aliquat 336 Concentration (M) | Strippant NaOH (M) | ⁶⁵Zn Tracer Stripped, % |
|---|---|---|
| 0.01 | 1 | 12.9 |
| | 3.75 | 97.7 |
| | 7.50 | 99.0 |
| 0.05 | 3 | 1.6 |
| | 8 | 40.0 |
| | 10 | 82.5 |
| | 12 | 98.5 |
| 0.1 | 7.5 | 3.2 |
| | 10 | 14.7 |
| | 12 | 37.4 |
| | 15 | 86.0 |

It is seen that the strippability of Zn varies with sodium hydroxide concentration. Depending on the amine extractant and NaOH concentration, the zinc as well as cyanide can be quantitatively stripped into the aqueous phase in several stages.

EXAMPLE I

This example shows how the process of the invention can be applied to a zinc cyanide industrial plating-rinse solution. The solution pH was 11.7 and contained 16 parts per million (ppm) Zn, 47 ppm cyanide, NaOH, and $Na_2CO_3$ as well as small amounts of proprietary additive of unknown composition. One hundred ml of 0.05 molar Adogen 464 a trialkyl methyl ammonium chloride obtained from Ashland Chemical Company, Chemical Products Division of Ashland Oil Company was dissolved in a kerosene-type diluent. The resultant organic solution was mixed with the aqueous rinse solution in a separatory funnel for three minutes. After separation of the phases, the organic solution was regenerated by stripping with 12 M NaOH solution. Analysis of the decontaminated rinse solution showed that 98% of the zinc and cyanide was removed from the rinse solution and that the 12 molar NaOH stripping solution removed more than 99% of the zinc and cyanide from the organic solvent. The final pH of the aqueous raffinate was 11.5

EXAMPLE II

Similar efficient stripping of cadimum cyanide can be obtained by stripping a cadmium cyanide complexed with the selected quaternary ammonium compound. Thus, a cadmium rinse solution having a pH of 9.9 and containing 68 ppm Cd, 268 ppm cyanide, and other materials as mentioned in the zinc plating rinse solution of Example I was extracted with a 0.02 molar Adogen 464 dissolved in a kerosene diluent and the resultant organic extract stripped with 12 M NaOH. Analyses of the decontaminated rinse solution showed that 99.9% of the cadmium and 98% of the cyanide was removed from the rinse solution. The 12 molar strip solution then removed greater than 99% of the cadmium and cyanide from the pregnant organic phase.

What is claimed is:

1. In a method for removing and recovering a metal selected from the group consisting of Zn or Cd and cyanide values from an alkaline cyanide solution in which said solution is contacted with an organic phase consisting essentially of a quaternary amine halide dissolved in an inert organic diluent, said amine halide having the general formula $(R_3CH_3)N$ Cl where R represents a )N Cl or branched chain alkyl group to effect transfer of said metal and cyanide values to the organic phase, the improvement which comprises stripping the metal and cyanide values from the organic phase with an aqueous solution of an alkali hydroxide.

2. The method according to claim 1 wherein the alkali hydroxide is NaOH.

3. The method according to claim 1 wherein the alkali hydroxide is KOH.

4. In a method for removing and recovering a metal selected from the group consisting essentially of Zn or Cd and cyanide values from an alkaline cyanide solution in which said solution is contacted in an extraction zone with an organic phase consisting essentially of a quaternary amine halide dissolved in an inert organic diluent, said amine salt having the general formula $(R_3CH_3)Ncl$ where R represents a straight or branched chain alkyl group to effect transfer of said metal and cyanide values to the organic phase, the improvement which comprises stripping the metal and cyanide values from the organic phase with an aqueous solution of a alkali hydroxide, and then recycling the resultant quaternary amine hydroxide for extraction of further metal and cyanide values in said extraction zone.

* * * * *